(12) United States Patent
Bos

(10) Patent No.: US 8,497,344 B2
(45) Date of Patent: Jul. 30, 2013

(54) PROCESS FOR MAKING DAPBI-CONTAINING ARAMID CRUMBS

(75) Inventor: Johannes Bos, Apeldoorn (NL)

(73) Assignee: Teijin Aramid B.V., Arnhem (NL)

( * ) Notice: Subject to any disclaimer, the term of this patent is extended or adjusted under 35 U.S.C. 154(b) by 1238 days.

(21) Appl. No.: 10/580,018

(22) PCT Filed: Nov. 11, 2004

(86) PCT No.: PCT/EP2004/012760
§ 371 (c)(1),
(2), (4) Date: May 19, 2006

(87) PCT Pub. No.: WO2005/054337
PCT Pub. Date: Jun. 16, 2005

(65) Prior Publication Data
US 2007/0083032 A1   Apr. 12, 2007

(30) Foreign Application Priority Data
Nov. 21, 2003  (EP) ..................................... 03026710

(51) Int. Cl.
*C08G 69/08* (2006.01)
(52) U.S. Cl.
USPC ........... 528/310; 528/183; 528/184; 528/190; 528/191
(58) Field of Classification Search
USPC ......................... 528/184, 183, 190, 191, 310
See application file for complete search history.

(56) References Cited

U.S. PATENT DOCUMENTS

| 4,018,735 A | | 4/1977 | Nakagawa et al. | |
| 4,172,938 A | | 10/1979 | Mera et al. | |
| 4,308,374 A | * | 12/1981 | Vollbracht et al. | ............. 528/336 |
| 5,646,234 A | * | 7/1997 | Jung et al. | ..................... 528/184 |

FOREIGN PATENT DOCUMENTS

SU   2017866   *  8/1992

OTHER PUBLICATIONS

Encyclopedia of Pol. Sci and Tech "Polyamides", vol. 3, p. 565-567, 2001.*

* cited by examiner

*Primary Examiner* — Gregory Listvoyb
(74) *Attorney, Agent, or Firm* — Oliff & Berridge, PLC

(57) ABSTRACT

A method for obtaining a composition of an aromatic polyamide containing para-phenylene terephthalamide and 2-(p-phenylene)benzimidazole terephthalamide units, the method including copolymerizing: i) a mole % of para phenylenediamine; ii) b mole % of 5(6)-amino-2-(p-aminophenyl)benzimidazole; and iii) 90-110 mole % of terephthaloyl dichloride in a mixture of N-methyl pyrrolidone and containing c wt. % of calcium chloride, wherein c is within the range from 1 to 20, and wherein the ratio a:b ranges from 1:20 to 20:1, a+b is 100 mole %, and i), ii), and iii) together comprise 1-20 wt. % of the mixture, wherein the product b·c is at least 50 and less than 215 and that the composition is a crumb with a relative viscosity ηrel of at least 4, wherein the crumb is defined as non-sticky particles at least 95% of which having an average diameter of 0.7-15 mm.

10 Claims, No Drawings

PROCESS FOR MAKING DAPBI-CONTAINING ARAMID CRUMBS

CROSS-REFERENCE TO RELATED APPLICATION

This application is a U.S. national stage application of PCT/EP2004/012760, filed Nov. 11, 2004, which PCT application is incorporated herein by reference in its entirety.

BACKGROUND

The invention relates to a method for obtaining a composition comprising an aromatic polyamide containing para-phenylene terephthalamide and 2-(p-phenylene)-benzimidazole terephthalamide units by copolymerizing para-phenylenediamine (PPD), 5(6)-amino-2-(p-aminophenyl) benzimidazole (DAPBI); and terephthaloyl dichloride (TDC) in a mixture of N-methyl pyrrolidone (NMP) and calcium chloride, and to said composition. The invention further relates to a method for making purified aromatic polymer from said composition.

Methods for making aramid polymers are known in the art. For instance, in U.S. Pat. No. 4,172,938, an aromatic polyamide was described to be made by polymerizing a mixture of diamines and an aromatic dicarboxylic acid dihalide in a mixture of N-methyl pyrrolidone and calcium chloride. In example 34 of this reference, the polymerization reaction is performed with a mixture of para-phenylene diamine (PPD) and 5-amino-2-(p-aminophenyl)-benzimidazole (DAPBI), and terephthaloyl dichloride (TDC) in N-methyl pyrrolidone (NMP) containing 2 wt. % of calcium chloride ($CaCl_2$). The product was obtained as a powdery clay-like material for which filtration was problematic. It was disclosed that products according to this reference in more general terms are obtained as slurry, paste, powder, or agar.

Other processes for making spin dopes of DAPBI-containing polymers are known from U.S. Pat. No. 5,646,234 and U.S. Pat. No. 4,018,735. U.S. Pat. No. 5,646,234 discloses a process for making a spin dope wherein the use of alkali metal halides, among which also calcium chloride, as additive is disclosed. However, very particular preference is given in using no additives, and in conformity herewith the specific examples do not use such additives. Moreover, if calcium chloride is applied according to this reference the amount thereof can be substantially higher than allowable for preventing formation of paste and the like. None of the examples of U.S. Pat. No. 4,018,735 disclose the use of calcium chloride, nor is such specific additive suggested in combination with N-methyl pyrrolidone, and for that reason the polymers of this reference will be obtained in the form of a paste, powder, and the like.

SUMMARY

It is an object of the present invention to provide conditions for performing such reaction and obtaining a composition in the form of a crumb or a crumb-like material. The term crumb or crumb-like as used in this invention means that the polymer mixture contains breakable clumps or particles, which are not sticky and have a mean particle size greater than 100 µm, usually greater than 1 mm. The term crumb in relation to this invention is defined as non-sticky particles, i.e., particles as in powders that do not stick together and remain free from each other, at least 95% of which have an average diameter 0.7-15 mm, preferably 1-7 mm.

DETAILED DESCRIPTION OF EMBODIMENTS

Such crumbs are known from the process of preparing of fully aromatic polyamides based on e.g., PPD and TDC, which products are known under the trade names TWARON® (Teijin Twaron) and KEVLAR® (DuPont). After polymerization in $NMP/CaCl_2$, a crumb is obtained which can be easily coagulated, washed, and dried, and the product obtained can be dissolved in sulfuric acid and shaped into a desired form, like fibers or films.

The monomer of interest, DAPBI (5(6)-amino-2-(p-aminophenyl)-benzimidazole; CAS reg. no: 7621-86-5), is added to the diamine mixture with the objective to obtain a suitable polymer solution right after polymerization with e.g., PPD and TDC, which can be directly shaped into fibers or films, whereby DAPBI is seen as a suitable co-monomer to keep the aramid polymer in solution. By selecting a specific ratio of PPD, DAPBI, and $CaCl_2$, the formation of powders, paste, dough, and the like can be prevented.

To this end, the invention relates to a method for obtaining a composition comprising an aromatic polyamide containing para-phenylene terephthalamide and 2-(p-phenylene)benzimidazole terephthalamide units by copolymerizing:

i) a mole % of para-phenylenediamine;
ii) b mole % of 5(6)-amino-2-(p-aminophenyl)benzimidazole; and
iii) 90-110 mole % of terephthaloyl dichloride in a mixture of N-methyl pyrrolidone and containing c wt. % of calcium chloride, wherein c is within the range from 1 to 20, and wherein the ratio a:b ranges from 1:20 to 20:1, a+b is 100 mole %, and i), ii), and iii) together comprise 1-20 wt. % of the mixture, wherein the product b·c is at least 50 and less than 215 and that the composition is a crumb with a relative viscosity $\eta rel$ of at least 4, wherein the crumb is defined as non-sticky particles at least 95% of which having an average diameter of 0.7-15 mm.

It is another objective of the present invention to obtain crumbs comprising a polymer with a sufficient high relative viscosity $\eta rel$. Relative viscosities $\eta rel$ of at least 4, more preferably between 4 and 7, most preferably at least 5 can be obtained according to the method of the invention. It is further preferred to have a mixture for copolymerization wherein b·c is at least 80.

In another object of the invention a method for obtaining a purified aromatic polyamide is obtained by coagulating and washing the obtained crumb with water, followed by drying. The drying step can be performed according to standard procedures, such as ambient conditions, or at elevated temperature and/or lowered pressure. Thus, the obtained material is suitable for making a spin dope by dissolving it in a solvent, for instance sulfuric acid, NMP, $NMP/CaCl_2$, dimethylacetamide, and the like. The dope can be used to manufacture formed articles, such as fibers, films, and the like.

In the following experiments, the aspects of the invention are exemplified.

General Polymerization Procedure

DAPBI (ex Spektr T.T.T., Russia) was dried under vacuum for 1 h at 160° C. PPD (Teijin Twaron), TDC (freshly distilled), $NMP/CaCl_2$ and NMP (both ex Teijin Twaron) were used as received (moisture content 80 ppm).

The glassware was pre-dried for 1 h in an air circulation oven at 120° C. A clean and dry 2 liter flask was supplied with a mechanical stirrer, $N_2$-inlet and outlet, and vacuum supply. Generally, the $N_2$-stream is between 40-60 ml/min. A large part (400 ml) of the solvent and the precisely pre-weighed amines were carefully brought in the reactor. The reactor was closed and purged two times with nitrogen. The mixture was stirred for 30 min at 150 rpm and heated to 60° C. and mixed for 0.5 h to dissolve or disperse the amines properly. The flask was cooled with ice/water to 5-10° C. After removing the coolant, the stirrer velocity was set at 320 rpm and a precisely pre-weighed amount of the acid chloride was brought into the vessel through a funnel. In all cases the mol ratio of the total number of amines and the acid chloride equals one. The flask, which contained the acid chloride and the funnel, was rinsed with the remaining solvent (50 ml). The vessel was closed and the mixture was allowed to react for at least 30 min (nitrogen flush between 40-60 ml/min). The stirring was stopped and the reaction vessel was removed.

The crumbed product together with demi-water was gently added into a Condux LV15 15/N3 coagulator and the mixture was collected on an RVS filter. The product was washed 4 times with 5 l of demi-water, collected in a 2 l glass beaker and dried under vacuum for 24 h at 80° C.

A sample was dissolved in sulfuric acid at room temperature. The flow time of the sample solution in sulfuric acid 96% (0.25% m/V) was measured at 25° C. in an Ubbelohde viscometer. Under identical conditions the flow time of the solvent was measured as well. The relative viscosity was then calculated as the ratio between the two observed flow times.

Results:

After addition of the TDC, the temperature increased rapidly and could reach its maximum between 40° and 70° C.

The Table shows some examples in which the polymer mixture turned into a crumbed mass, which could easily be coagulated and washed. To obtain crumbs the DAPBI content, monomer concentration, and the $CaCl_2$ concentration must be balanced according to the invention. The relative viscosity, inherent viscosity, and appearance (crumb or others) are given in the Table. PPD, DAPBI and TDC together comprise about 10 to 12 wt. % of the mixture.

In comparative examples I-III, the polymer mixture was rendered as a dough polymer mass or as rubbery "chewing gum-like" mass, due to the high $CaCl_2$ content. In Comparative Example IV, first a precipitate was formed, which was later converted to a dough-like mass. The $CaCl_2$ content was too low to obtain a crumb. Comparative Example V (according to U.S. Pat. No. 4,172,938 having an inherent viscosity of 1.93, see Table) resulted in a powdery material, which after coagulation was very difficult to filter. It behaved like a clay-like material.

TABLE

| | PPD a mole % | DAPBI b mole % | $CaCl_2$ c wt. % | b·c | $\eta$rel | $\eta$inh | crumb |
|---|---|---|---|---|---|---|---|
| Examples | | | | | | | |
| 1 | 90 | 10 | 10.40 | 104.0 | 6.29 | 6.46 | yes |
| 2 | 90 | 10 | 11.55 | 115.5 | 5.93 | 6.2# | yes |
| 3 | 80 | 20 | 9.85 | 197.0 | 5.38 | 5.92 | yes |
| 4 | 80 | 20 | 10.28 | 205.6 | 4.10 | 5 | yes |
| 5 | 60 | 40 | 4.77 | 190.8 | 5.69 | 6.01 | yes |
| 6 | 33 | 67 | 3.09 | 207.0 | 6.98 | 6.45 | yes |
| 7 | 30 | 70 | 2.82 | 197.4 | 6.2* | 6.3# | yes |
| Comparative Examples | | | | | | | |
| I | 80 | 20 | 11.55 | 231.0 | 4.59 | 5.3# | dough/paste |
| II | 60 | 40 | 5.49 | 219.6 | 5.87 | 6.2 | dough/paste |
| III | 33 | 67 | 4.56 | 306.9 | 2.75 | 3.58 | dough/paste |
| IV | 33 | 67 | 2.88 | 193.0 | 2.31 | 3.04 | gel+ |
| V | 80 | 20 | 1.96 | 39.2 | 1.56 | 1.93 | powder |

*average of 3 values
calculated value
+gel with precipitated particles

The Table shows the advantageous properties when the conditions of the invention are satisfied. For instance, Comparative example V (according to U.S. Pat. No. 4,172,938) has a product b·c value outside the claimed range (39.2), but a relative viscosity below 4 (1.56). No crumb is formed, but a powder is formed (having a particle size far below the average diameter 0.7 mm).

The invention claimed is:

1. A method for obtaining an aromatic polyamide containing para-phenylene terephthalamide and 2-(p-phenylene) benzimidazole terephthalamide units, in the form of a crumb, by copolymerizing:
   i) a mole % of para-phenylenediamine;
   ii) b mole % of 5(6)-amino-2-(p-aminophenyl)benzimidazole; and
   iii) 90-110 mole % of terephthaloyl dichloride
in a mixture of N-methyl pyrrolidone and containing c wt. % of calcium chloride,
   wherein c is within the range from 1 to 20, and wherein the ratio a:b ranges from 1:20 to 20:1, a+b is 100 mole %, and i), ii), and iii) together comprise 1-20 wt. % of the mixture,
   wherein the product b·c is at least 50 and less than 215 and the aromatic polyamide in the crumb has a relative viscosity $\eta$rel of at least 4,
   wherein the crumb is defined as non-sticky particles at least 95% of which having an average diameter of 0.7-15 mm, and
   wherein the crumb is formed directly by the copolymerizing.

2. An aromatic polyamide containing para-phenylene terephthalamide and 2-(p-phenylene)benzimidazole terephthalamide units, in the form of a crumb, obtained directly by copolymerizing para-phenylenediamine; 5(6)-amino-2-(aminophenyl)benzimidazole; and terephthaloyl dichloride in a mixture of N-methyl pyrrolidone and calcium chloride,
   wherein the aromatic polyamide in the crumb has a relative viscosity $\eta$rel of at least 4, and
   wherein the crumb is defined as non-sticky particles at least 95% of which having an average diameter of 0.7-15 mm.

3. The aromatic polyamide of claim 2, wherein the aromatic polyamide in the crumb has a relative viscosity $\eta$rel between 4 and 7.

4. A method for making purified aromatic polyamide by coagulating and washing the crumb of claim 2 in water, followed by a drying step.

5. A method for making purified aromatic polyamide by coagulating and washing the crumb of claim 3 in water, followed by a drying step.

6. A method for obtaining a composition comprising the purified aromatic polyamide obtained by the method of claim 4, the method comprising:
   dissolving the purified aromatic polyamide in the form of a crumb in a solvent.

7. The method of claim 6, wherein the solvent is selected from the group consisting of sulfuric acid, N-methyl pyrrolidone, dimethylacetamide and combinations thereof.

8. A method for obtaining a composition comprising the purified aromatic polyamide obtained by the method of claim 5, the method comprising:
   dissolving the purified aromatic polyamide in the form of a crumb in a solvent.

9. The method of claim 8, wherein the solvent is selected from the group consisting of sulfuric acid, N-methyl pyrrolidone, dimethylacetamide and combinations thereof.

10. A method for obtaining an aromatic polyamide containing para-phenylene terephthalamide and 2-(p-phenylene) benzimidazole terephthalamide units, in the form of a crumb, the method consisting of copolymerizing:
   i) a mole % of para-phenylenediamine;
   ii) b mole % of 5(6)-amino-2-(p-aminophenyl)benzimidazole; and
   iii) 90-110 mole % of terephthaloyl dichloride
in a mixture of N-methyl pyrrolidone and containing c wt. % of calcium chloride,
   wherein c is within the range from 1 to 20, and wherein the ratio a:b ranges from 1:20 to 20:1, a+b is 100 mole %, and i), ii), and iii) together comprise 1-20 wt. % of the mixture,
   wherein the product b·c is at least 50 and less than 215 and the aromatic polyamide in the crumb has a relative viscosity $\eta_{rel}$ of at least 4, and
   wherein the crumb is defined as non-sticky particles at least 95% of which having an average diameter of 0.7-15 mm.

\* \* \* \* \*